United States Patent [19]

Sanford

[11] Patent Number: 5,083,793
[45] Date of Patent: Jan. 28, 1992

[54] MULTIPLE CHOICES MATHEMATICAL GAME APPARATUS

[76] Inventor: Bruce R. Sanford, 103 Church St., P.O. Box 54, Windsor, N.J. 08561

[21] Appl. No.: 570,328

[22] Filed: Aug. 20, 1990

Related U.S. Application Data

[63] Continuation-in-part of Ser. No. 478,827, Feb. 12, 1990.

[51] Int. Cl.$^5$ .......................... A63F 3/00; G09B 19/02
[52] U.S. Cl. ............................. 273/249; 273/272; 273/146; 434/191; 434/207; 434/209
[58] Field of Search ............... 273/249, 272, 146, 248; 434/207, 209, 188, 191

[56] References Cited

U.S. PATENT DOCUMENTS

| | | | |
|---|---|---|---|
| 925,142 | 6/1909 | Spillman | 273/249 |
| 1,406,691 | 2/1922 | Sewell | 273/249 |
| 1,523,615 | 1/1925 | Stern | 273/146 |
| 2,077,010 | 4/1937 | Robertson | 273/146 |
| 3,104,106 | 9/1963 | Kenney et al. | 273/249 |
| 4,029,320 | 6/1977 | Hausman | 273/249 |
| 4,717,154 | 1/1988 | Miller | 273/146 |
| 4,927,155 | 5/1990 | Bellinger | 273/146 |

FOREIGN PATENT DOCUMENTS

| | | | |
|---|---|---|---|
| 820991 | 11/1937 | France | 273/146 |
| 264034 | 6/1964 | Netherlands | 434/207 |

*Primary Examiner*—Benjamin Layno
*Attorney, Agent, or Firm*—Sachs & Sachs

[57] ABSTRACT

A mathematical game apparatus includes a game board having a plurality of concentric circles providing paths or playing paths divided into a plurality of sections, each section being provided with indicia (numerals) therein for the purpose of having the players learn and/or improve their ability to count from 1 to 125 by multiple units in addition to increasing their acuity in utilizing prime numbers and factors; perfect squares and cubes; and exponential powers of 10.

15 Claims, 5 Drawing Sheets

PRIOR ART

MULTIPLE CHOICES MATHEMATICAL GAME APPARATUS

The within application is a Continuation-In-Part application of previously filed patent application given Ser. No. 07/478,827, and filed Feb. 12, 1990, now abandoned.

BACKGROUND OF THE INVENTION

1. Field of the Invention

The present invention relates to game board apparatuses and, in particular, to a mathematical board game.

2. Description of the Relevant Art

The prior art abounds with game boards and apparatuses for use in amusing the players as well as teaching them the various aspects of numerology, whether they be mathematical relationships or, for example, days of the year and/or seasons. In particular, the patent to R. Sewell, U.S. Pat. No. 1,406,691, which issued on Feb. 14, 1922, discloses a game board having a plurality of concentric circles disposed thereon with each of the concentric circles being divided according to the days of the month with portions thereon indicating the seasons of the year. Dates and seasons are related to various incidents of farm life likely to occur throughout the year. The player, having his token land on one of the spaces, may either suffer a penalty or receive a reward depending upon the season and the day of the month on which he landed. Thus, the game is intended to be amusing and would acquaint one with the various things that occur in farm life throughout the year. Each player may move around the board by either the throwing of dice or utilizing a spinner of some type to indicate the number of moves the player's token is to advance.

The patent to Tornes, U.S. Pat. No. 1,572,254, issued on Feb. 9, 1926, discloses multiple concentric paths leading to a centrally disposed circle which is the finish or goal point. The circular concentric circle paths are provided with different colors and provide for a penalty or reward depending upon their color when a token of a particular player lands thereon. The tokens or playing pieces are moved around the board by using conventional dice.

The patent to Ellis, U.S. Pat. No. 3,433,483, issued on Mar. 18, 1969, provides two concentric paths with the inner and outer paths being color coded and connected together at spaced intervals. Playing markers or tokens are provided for each player and a conventional dice is used to determine the movement of the players' markers or tokens. The concentric paths are not provided with any numerical indicia therein and there is no numerical relationship between one particular circle or segment of the board with another.

The present invention overcomes the shortcomings of the prior art by providing indicia in each of the sections or spaces provided in the concentric paths that have numerical relationships with each other and thus, utilizing the geometric flats or dice will teach or enhance the players knowledge and improve their mathematical acuity as they move between different positions on the playing board.

Therefore, it is an object of the present invention to provide a mathematical game apparatus which will entertain youngsters as well as adults while improving their mathematical acuity.

It is another object of the present invention to provide a mathematical game board whereon youngsters as well as adults may learn and/or improve their ability to count by one's, two's, three's and five's.

It is yet another object of the present invention to teach youngsters as well as adults to become familiar with prime numbers and factors; perfect squares and cubes; and exponential powers of ten while providing an incentive to reach a goal.

The foregoing and other objects and advantages will appear from the description to follow. In the description, reference is made to the accompanying drawing which forms a part hereof, and in which is shown by way of illustration, a specific embodiment in which the invention may be practiced. This embodiment will be described in sufficient detail to enable those skilled in the art to practice the invention, and it is to be understood that other embodiments may be utilized and their structural changes may be made without departing from the scope of the invention. The following detailed description is, therefore, not to be taken in a limiting sense, and the scope of the present invention is best defined by the appended claims.

SUMMARY OF THE INVENTION

A mathematical board game, in which the board therein is designed to show nine (9) distinct concentric areas, and a surrounding area, each area containing numerical information, the surrounding area being divided into a plurality of sections not intended to be one of the nine (9) playable circular paths containing various indicia to be traversed by marker playing pieces being guided by chance by a plurality of geometric flats, preferably three (3) having a plurality of flat surfaces thereon, preferably five (5), six (6) or seven (7). Beginning at the ENTER sign, which is the numeral zero (0) or starting position of the game, uniquely located at a particular radial extremity of the first circular path, the token or marker playing pieces advance in a clockwise direction from the original zero (0) starting position and, as play continues, advance in a clockwise direction from each respective concentric circular path's zero (0) starting position to the next inner concentric circular path and so forth, toward the most central of said ten (10) concentric circularly-spaced areas, finally reaching the innermost concentric area of the game board. The innermost area is provided with the indicia one trillion ($10^{12}$ or 1,000,000,000,000) as the central mono-sectional circle space and victory location of the mathematical board game. The instant mathematical game apparatus is adaptable for use by one or many players, especially youngsters, as well as adults. The player tokens (marker playing pieces) are provided in a variety of distinct colors and geometric shapes. Three geometrical flats having conventional dot indicia on their respective flat faces are provided for determining the "highest goes first" as well as general movement of the players' tokens in conjunction with various other discretionary multiple choices based on mathematical skill and alertness of the players.

There are three preferred overlapping sets of rules to play the game, having three levels of difficulty and complexity from Set I being the least difficult, to Set III, being the most difficult and complex. This permits the players to make multiple choices as to which level of difficulty and challenge to endeavor, including whether to play with one, a group of two, or a group of three tokens or marker playing pieces per player. The colors and symbols are independent of the game playing aspect of the game, however, they may serve as informational and educational clues, guides or other indicators depicting and relating various numerical information on the playing board assisting the players to keep on the proper playing paths, as well as, enhancing the appearance of the game board itself.

BRIEF DESCRIPTION OF THE DRAWING

In order that the invention may be more fully understood, it will now be described, by way of example, with reference to the accompanying drawing, in which.

DESCRIPTION OF THE PREFERRED EMBODIMENT

Figure 1:
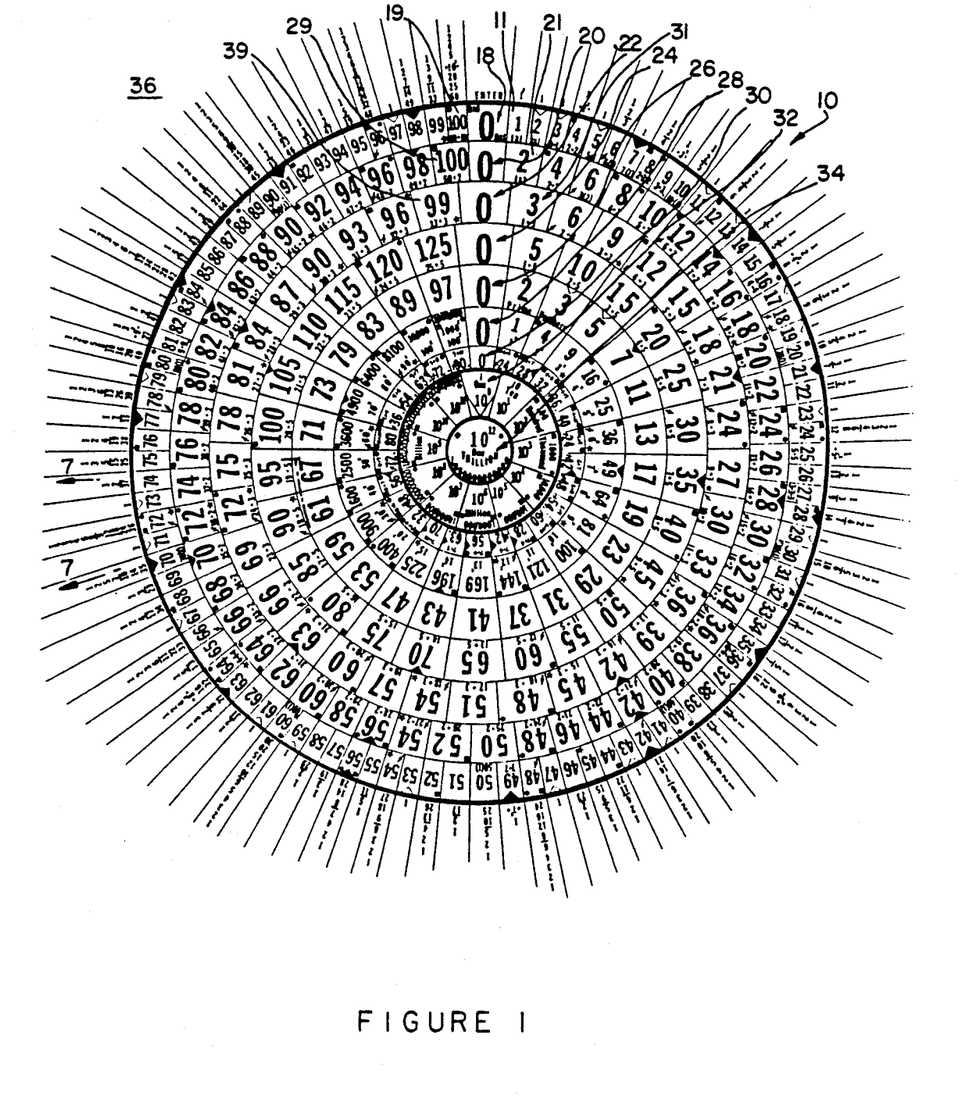
FIG. 1 is a top plan view of the mathematical game board or playing field apparatus, according to the principles of the present invention.

Referring now to the Figures and, in particular, to FIG. 1, there is shown a mathematical game board apparatus, according to the principles of the present invention, suitable for amusement and educational purposes and provides applicable basic as well as sophisticated information relating to basic mathematical operations of addition and subtraction of numbers; counting in consecutive order by one's, two's, three's, five's; translating, reading and verbalizing numerals large and small; practicing and controlling the operations of multiplication and division involving numerals one through ten; exposure to the prime numbers between zero and one hundred, various perfect squares, perfect cubes, specific exponential powers of the number 10; and other interrelated aspects of any of the above. By using any one of the three sets of rules associated with the game board 10 being used, players are exposed to challenging options or multiple choices in selecting respective moves based on mathematical relationships involving the mathematical skill and talent of the players themselves, as well as the chance determined by the roll of the geometric flats 12, 14 and 16 (See FIG. 4).

There are nine playing areas 18, 20, 22, 24, 26, 28, 30 32 and 34 provided on the game board 10. The playing areas 18, 20, 22, 24, 26, 28, 30, 32 and 34 are formed of concentric paths decreasing in size and divided into a plurality of sections, described hereinafter, until the central unitary circular area 34 is reached at the center of the board.

The first playing area 18 on the game board 10, shown in FIG. 1, is divided into a plurality of sections 19 within which is disposed numerical information with the indicia or numeral 0 being disposed beneath the ENTER point. The numeral or indicia 0 is disposed thereunder in each of the concentric paths which also and coincidentally represents $0 \times 1$ and continues in a clockwise direction designated with the consecutive multiples of the number "one", beginning with $1 \times 1$ equaling 1 and ending with $100 \times 1$ equaling 100 (11 and 19, respectively).

The second playing area 20 of game board 10 comprises a circular path divided into 51 sections of numerical information having a starting indicia 0 and continues in a clockwise direction, with consecutive multiples of the number "two", beginning with $2 \times 1$ equaling 2 and ending with $50 \times 2$ equaling 100 (21 and 29, respectively).

The third playing area 22 is divided into 34 sections of numerical information in the third circular path, having a starting position with indicia 0, and continuing in a clockwise direction, with the consecutive multiples of the number "three", beginning with $3 \times 1$ equaling 3 and ending with $33 \times 3$ equaling 99 (31 and 39, respectively).

The fourth playing area 24 is divided into 26 sections of the fourth circular path, starting with indicia 0 and continues in a clockwise direction, with consecutive multiples of the number "five", beginning with $5 \times 1$ equaling 5 and ending with $25 \times 5$ equaling 125 (41 and 49, respectively).

The fifth playing area 26 is the fifth circular path which is divided into 26 sections of numerical information starting with indicia 0, and continuing in a clockwise direction, beginning with the prime number "two", followed by the consecutive prime numbers existing between 0 and 100, ending with the final prime number 97 with the fifth playing area being labeled as "prime numbers" (51 and 59, respectively).

The sixth playing area 28 on game board 10 has its circular path divided into 26 sections of numerical information each being "perfect squares" and having a starting position indicia 0 and continuing in a clockwise direction with indicia in each section designating the consecutive exponential perfect squares beginning with the numeral "one" raised to the second power equaling 1 through 15 raised to the second power equaling 225, followed by 20 raised to the second power equaling 400, and then skipping by tens to 100 raised to the second power equaling 10,000, and ending with 1,000 raised to the second power equaling 1,000,000, and indicated in the same section, 100 raised to the third power which is also equal to 1,000,000.

The seventh playing area 30 or circular path is divided into 26 sections of numerical information with a starting position indicia of 0, and continuing in a clockwise direction, indicia heretofore not uniquely indicated in any circular path as being multiples of the numbers "four", "six", "seven", "eight", "nine" and "ten", beginning with $4 \times 6$ equaling 24, (71) and continuing in a clockwise direction, various other indicia within the path designated as $6 \times 7$ equaling 42, (73) $7 \times 8$ equaling 56, (74) $8 \times 9$ equaling 72, (75) and ending $9 \times 10$ equaling 90 (79).

The eighth playing area 32 of game board 10 consists of a circular path divided into 12 sections of numerical information, the starting position indicia being 10 to the 0 power and continuing in a clockwise direction, indicia designating consecutive exponential powers of the number 10 from 10 to the first power (80) and ending with the last section of 10 to the eleventh power (89).

The "Inner Circle" 34 of game board 10 is the ninth playing area and comprises a single unitary section centrally disposed in the playing board 10 and is the winning and final position of the game, and represents the indicia of 10 raised to the twelfth power which equals one trillion or the number value 1,000,000,000,000.

The board 10 further includes a non-playable and non-traversable area 36 comprising 101 sections into which the surrounding area of the game board 10 is divided. The non-traversable area 36 is divided into 101 sections as is the first circular path 18 and contains the particular 100 sets of divisor factors of the respective 100 numerals inside the first circular path. Also included in area 36 is a section containing the word "ENTER" which is coincidentally located above the 0 indicia and is the starting point for the game. It is also the section in which players will line up their respective marker playing pieces, the solid rectangle 38, the solid triangle 40 and solid cylinder 42 shown in FIG. 5. The marker playing pieces or tokens are positioned in the "ENTER" section of area 36 and must wait their turn to enter the game at the starting position 0, upon the roll of the three geometric flats shown in FIG. 4, to begin play.

Each numeral within the first circular path 18 coincidentally represents the largest factor, herein also called the "Product Focus Number", complementing each of the respective one hundred sets of divisor factors comprising the outer non-traversable area 36 of game board 10.

Although the area 36 is not intended as a playing area to be traversed by the marker playing pieces or tokens 38, 40 and 42 during play, a player may glean information from this area during computational exercises, perhaps to expedite the application or execution of any particular rule(s) of the game. It is also important to describe the area 36 containing the one hundred sets of divisor factors more specifically. For example, referring to area 36 of FIG. 6, by scanning in a clockwise direction from the "ENTER" sign to reference numeral 130 designating the set of divisor factors 1, 2, 3,/6, 9, 18 of the product focus number 18 in the first circular path playing area 18. Observe the symbol of the horizontal separating bar or line—131. This symbol—131 highlights and separates the distinct middle two factors 3/6 of this convergent set of divisor factors and is similarly intended in sixty-four other of the one hundred sets of divisor factors throughout the area 36. The product of the distinct middle two factors 3/6, is equal to its product focus number 18 located within its section of the first playable circular path 18 of game board 10.

Figure 6:
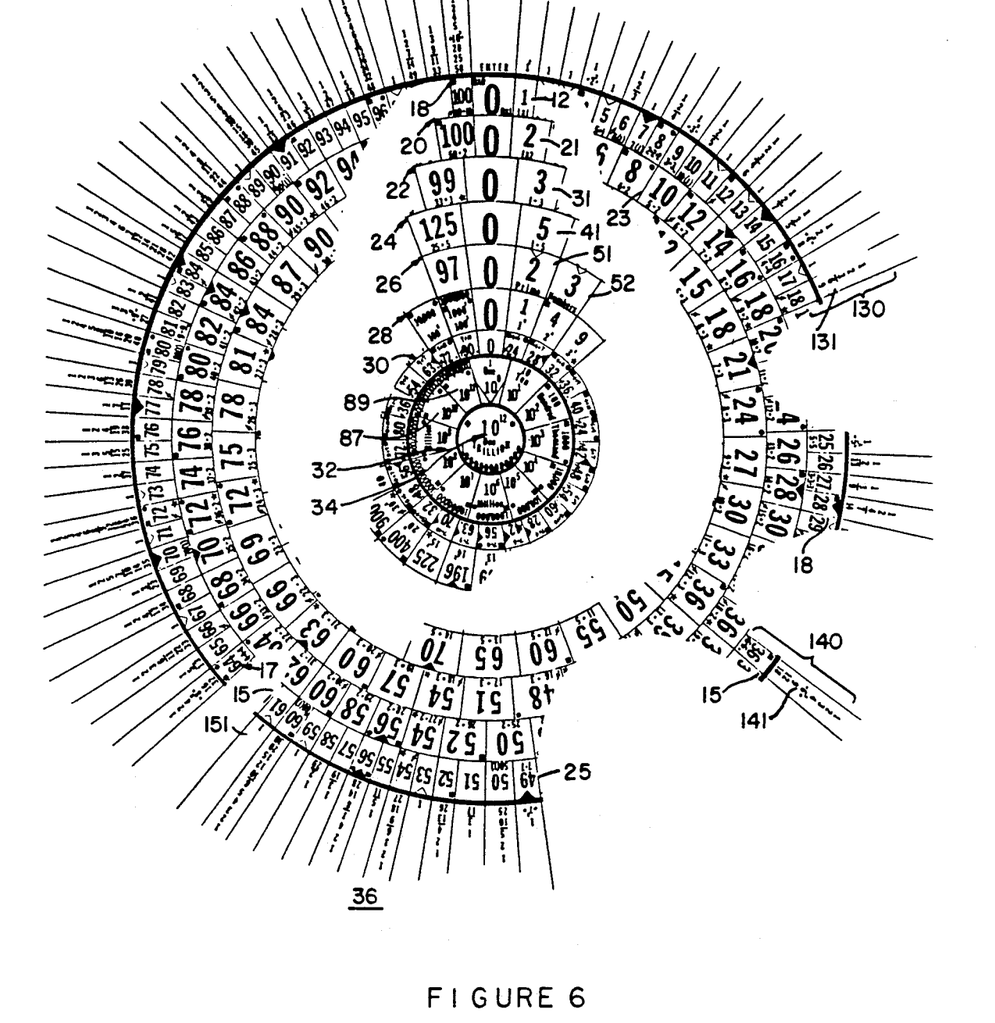
FIG. 6 is a top plan view of the mathematical game board of FIG. 1 with portions removed so as to facilitate the location of various reference numerals as mentioned within the specification.

Upon scanning further in a clockwise direction across the cutaway portion of area 36 in FIG. 6, to reference numeral 140 designating the set of divisor factors 1, 2, 3, 4, $6^2$, 9, 12, 18, 36 of the product focus-number 36, also observe the double dots symbol ··, the symbol being similarly indicated and strategically located in nine other of the one hundred sets of divisor factors within the area 36.

The double dot symbol 141 represents and intends the existence of a distinct middle factor the perfect square of which is the product focus number located within the first circular path 18 of the game board 10. In the present observation, the product of 6 to the second power coincidentally equals the value of the largest factor in the set (140), the product focus number 36.

Upon scanning still further in a clockwise direction within area 36 of FIG. 6 to reference numeral 151 in the first circular path 18 to the product focus number 61, these two distinct factors make up the set of divisor factors 1 and 61 of the product focus number 61. There are twenty-four other sets of divisor factors similarly intended within area 36 and the first circular path 18. The twenty-five sets in total represent the focus numbers within the first circular path 18 which are by definition prime numbers whose respective distinct second factor is always the number "1", similar to reference numeral 151.

Figure 3:
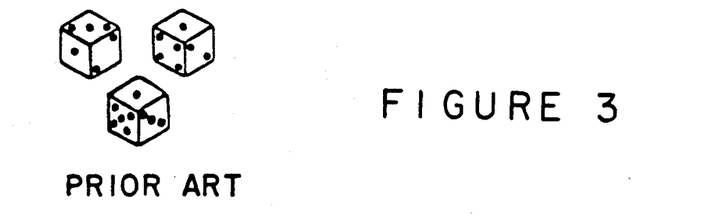
FIG. 3 is a perspective view of a typical set of three conventional dice having conventional dot indicia on their respective faces.

FIG. 3 discloses three conventional dice each having thereon the indicia numerals or dots, representing numerals one through six which may be used in playing the present board game and which are well known in the art.

Figure 4:
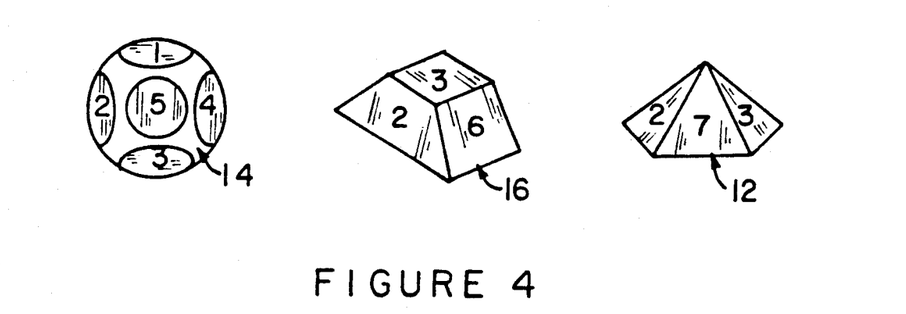
FIG. 4 is a perspective view of a set of three geometric flats which are preferably utilized in lieu of the conventional dice.

FIG. 4 discloses a set of geometric flats 12, 14 and 16 which are not cubic in shape and are preferably utilized in playing the instant game. A geometric flat, specifically a six sided pyramid 12 has a base with indicias appearing on each of the sides with the numbers one through seven (including the base) appearing thereon, so that when tossed onto a flat surface the numerals one through six may appear on the top surface or the numeral seven occurs when the geometric flat lands on its base.

The geometric flat 14 is spherical in shape having only five flat surfaces disposed thereon so that when rolled on a flat surface any one of the numerals represented by indicia or dots one through five may be positioned downward and counted in the sum total of the three geometric flats. Geometric flat 16 is a four sided truncated pyramid having indicia one through six thereon and may be made with dots in lieu of the indicia. Each of the surfaces may be faced downwardly depending upon its position when rolled on a flat surface. Preferably, the geometric flats are resilient in nature so that when rolled on a flat surface, the irregularity of movement and ability to bounce will add suspense as to which of the numbers will be facing in an upwardly direction. Preferably, geometric flats are to be used in playing of the game to add more excitement and interest for the players, however, the game may also be played using the conventional dice as shown in FIG. 3.

Preferably, the game board 10 may have the following colors and symbols inserted in various portions thereof in order to enhance the appearance of the board and increase the visibility of particular numbers on the board as well as enhance the educational impact and mathematical facility of the player(s).

Any numeral divisible by the factor "2" preferably has its section, or a portion thereof, colored green.

Any numeral divisible by the factor "3" preferably has its section, or a portion thereof, colored yellow.

Figure 7:
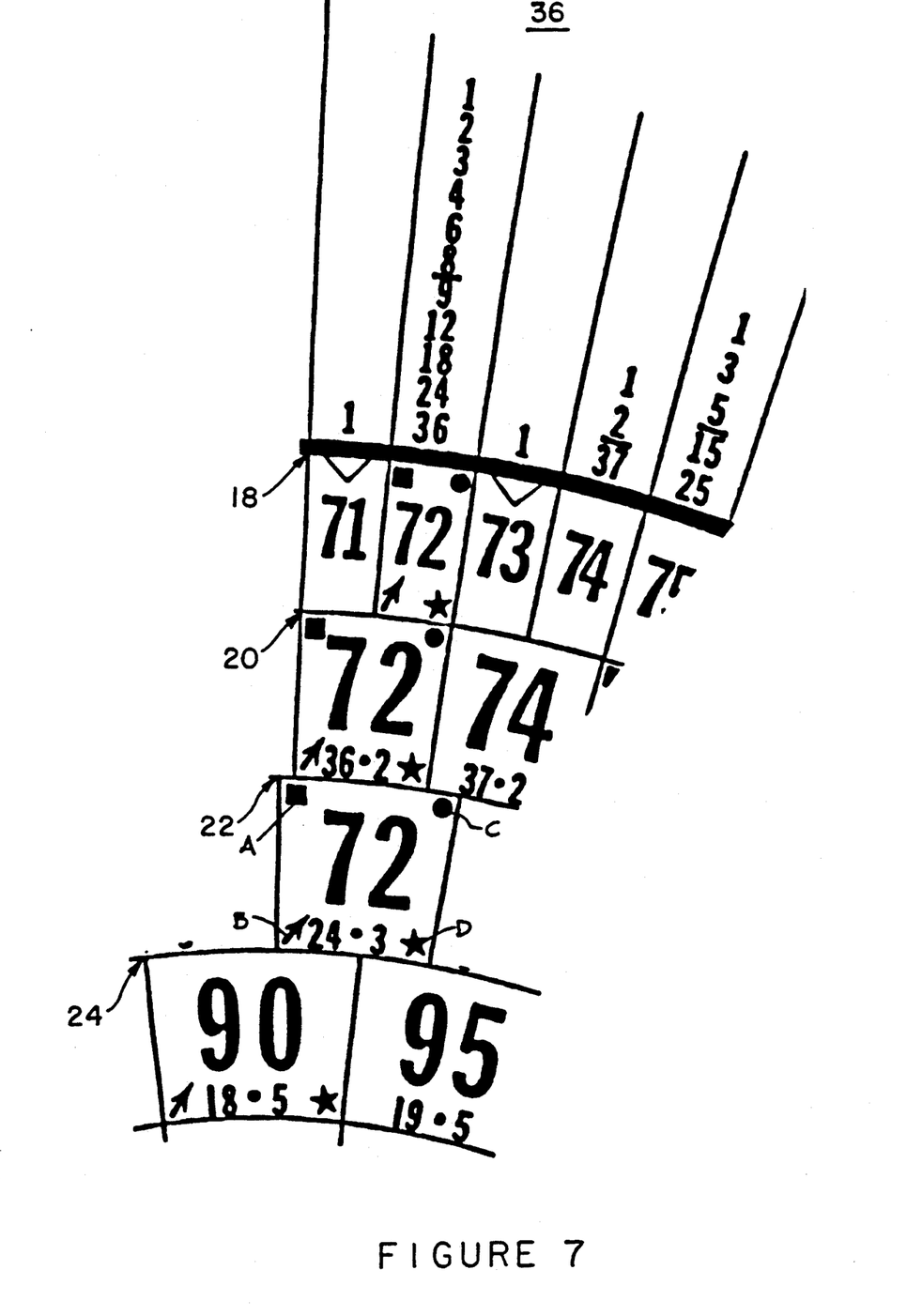
FIG. 7 is a greatly enlarged view of the game board or FIG. 1 depicting the manner in which the box (A), arrow (B) circle (C) and star (D) symbols may be used and positioned within various numeral sections of the game board.

Any numeral divisible by the factor "4" preferably the Box symbol (□) inscribed in the upper left hand corner of the respective section, represented by reference letter (A) in FIG. 7.

Any numeral divisible by the factor "5" preferably has its section, or a portion thereof, colored blue.

Any numeral divisible by the factor "6" preferably has the Arrow symbol (→) inscribed in the lower left hand corner of the respective section, represented by reference letter (B) in FIG. 7.

Any numeral divisible by the factor "7" preferably has a portion of its section colored with a black triangularly-shaped (▽) symbol.

Any numeral divisible by the factor "8" preferably has the Circle symbol (◯) inscribed in the upper right hand corner of the respective section, represented by reference letter (C) in FIG. 7.

Any numeral divisible by the factor "9" preferably has the Star symbol (☆) inscribed in the lower right hand corner of the respective section, represented by reference letter (D) in FIG. 7.

Any numeral divisible by the factor "10" preferably has its section, or a portion thereof, colored generally goldenrod, more specifically known as 142C on the Pantone Color Formula Guide chart, distributed by Pantone Incorporated of Moonachie, N.J.

Any numeral which could be defined as a "Perfect Square" preferably has its section, or a portion thereof, colored orange.

Any numeral which could be defined as a "Perfect Cube" preferably has its section, or a portion thereof, colored purple.

Any numeral which could be defined as a "Prime Number" preferably has its section, or a portion thereof, colored red.

Any numeral which could be defined as a "Composite Number" preferably has as many segments of its respective sections colored red as would correspond to the frequency of occurrence of prime factors within the composite numeral.

RULES OF THE MATHEMATICAL GAME APPARATUS

In order to determine the sequence for taking turns, each player rolls the three geometric flats shown in FIG. 4 or the dice as shown in FIG. 3. The player receiving the highest face-down total goes first; the second highest goes second; and so on until all players know their respective order for taking turns while playing the game. If there is a duplication (a tie) of totals, the players holding duplicate numbers roll again until the tie is broken. Once the order of play is determined, the players may line up their respective marker playing pieces or tokens (shown in FIG. 5) in the outside area 36 above the ENTER indicia in the order of turn to be taken.

Figure 5:
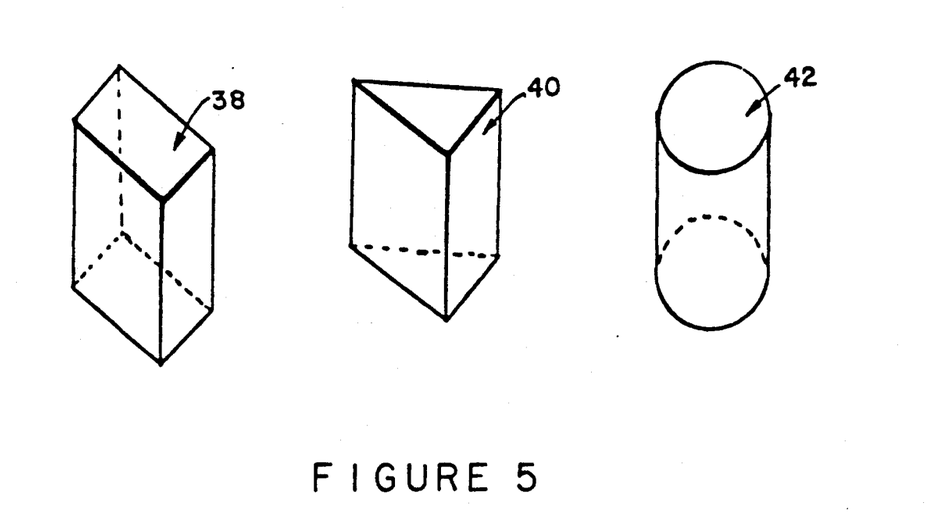
FIG. 5 is a perspective view of the typical token markers or playing pieces which are used by the players.

Each player prepares to take his or her respective first turn by placing their marker playing piece or token on the zero (0) starting position of the first circular path 18 of multiples of the number 1, rolls the three geometric flats or dice and begins play. The marker playing piece of each of the players should be clearly differentiated either by preferred colors red or white or blue, and/or by preferred geometric designs a solid rectangle 38 or a solid triangle 40 or a solid cylinder 42, as shown in FIG. 5, so as to facilitate play and make obvious the ownership of various marker playing pieces being moved about the game board 10 during play.

ATTENTION: The first player to reach "THE INNER CIRCLE" 34 wins!

SET I OF THE RULES

RULE #1. Roll the three geometric flats 12, 14 and 16 on a preferably hard flat surface. Add the three face-down dot values or indicia and move marker playing piece from starting position of 0 in a clockwise direction onto the first circular ring path 18 of multiples of 1, counting as many sections ahead as the total value rolled on the three geometric flats. Once play is underway, each player's respective turn will involve rolling the geometric flats and moving marker playing pieces ahead from the location reached on the previous turn as many sections as total face-down dot values or indicia on the three geometric flats indicate. (Hereinafter, where reference is made to "dice" it is to be understood the preferred member to be used are geometric flats as shown in FIG. 4.)

RULE #2. As play continues and a player rolls a total value on the three dice which is more than enough to reach and surpass the last section of a respective path, the player may only proceed to and must stop at the respective zero (0) starting position of the next path and not go on into the next path until his or her next turn. Also, if a player rolls a total which would place his or her marker playing piece exactly on the last section of a particular ring path, the player will still need to wait until next turn and will be permitted only onto the starting position 0 of the next ring path of play and may go no farther, regardless of the value rolled with the three dice. (Exceptions to this rule are explained regarding Jump-Moves related to Rules #3, #4 and #5 in this SET I of The Rules of The Game.)

RULE #3. If a player lands on a Perfect Square number-value, the player may immediately JUMP AHEAD to the next Perfect Square number-value. Example: If in the first ring path, a player lands on the numeral 36 (15) of game board 10 of FIG. 6, the player may JUMP AHEAD to the numeral 49 (25). (Definition: A "Perfect Square" number-value is the product of a number multiplied by itself.) Preferably, a path section of game board 10 containing a Perfect Square may have all or a portion of its section colored orange.

Figure 2:
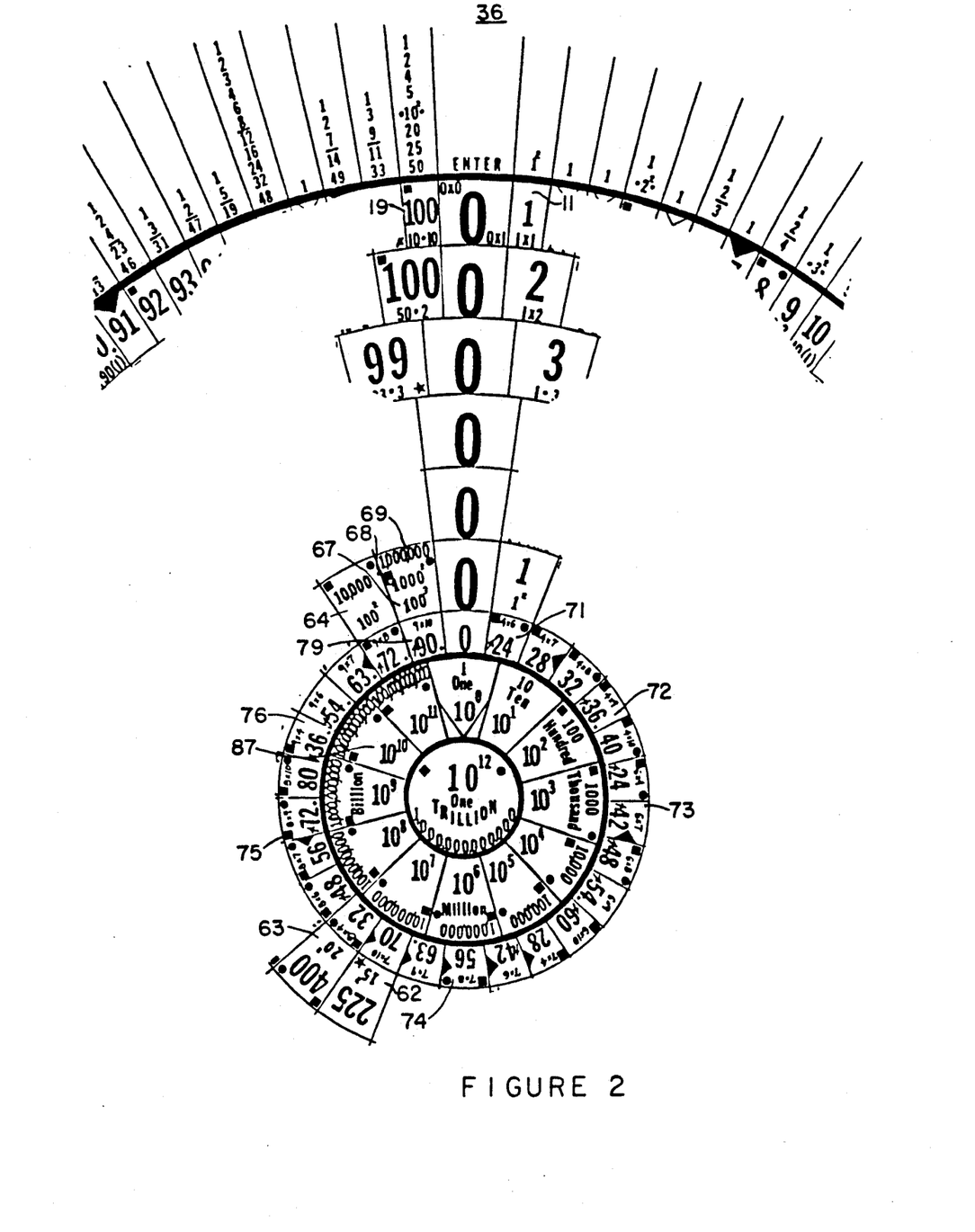
FIG. 2 is a view of an enlarged portion of the mathematical game board of FIG. 1 generally encompassing the portion indicated by the lines 7—7.

It is permissible during application of Rule #3 to move from one path into the next ring path without stopping and waiting at the 0 starting position; HOWEVER, the following three situations are those during which the Perfect Square JUMP-MOVE is NOT PERMITTED:

a) When a player is working around the sixth circular ring path 28 of Perfect Squares;

b) If during play within the seventh circular path 30 a player lands on the second occurrence of the Perfect Square numeral 36 (76), designated as 9×4 in FIGS. 2 and 6, the first occurrence also being the numeral 36 (72), designated as 4×9 in the same path 30, a player may move ahead only to the last section of the path, which is 90 (79), designated as 9×10, as follow Rule #6 on next turn.

c) If during play within THE RING OF POWER 32, a player lands on section $10^{10}$ (87) of game board 10 in FIGS. 2 and 6, which is understood to be a Perfect Square $10^5$ times $10^5$, the player may move ahead only to the last section $10^{11}$ (89) of the path 32, and wait for his or her next turn to follow Rule #7.

RULE #4. If a player lands on a Perfect Cube number-value, the player may immediately JUMP AHEAD to the next Perfect Cube number-value. Example: If a player is in the first path 18 and lands on the numeral 64 (17) of game board 10 in FIG. 6, a player may JUMP AHEAD into the next path 20 and rest on the numeral section 8 (23) of game board 10 shown in FIG. 6, and in this instance pass over the 0 of the starting position of the second path ring 20. (Definition: A "Perfect Cube" number-value is the product obtained by writing down a number three times and then multiplying). Preferably, a section of the preferred embodiment of game board 10 containing a Perfect Cube may have a portion of its section colored purple.

It is permissible during the application of this Rule #4 to move from one path into the next without stopping and waiting at the 0 starting position; HOWEVER, the following situations are those during which the Perfect Cube JUMP-MOVE is NOT Permitted:

a) If during play within the sixth circular path 28 of Perfect Squares, a player lands on the last section 1,000,000, which is the Perfect Cube $100^3$, and since there are no Perfect Cubes within the next circular path 30, a player may JUMP-MOVE to the last section 90 (79) of seventh path 30 and wait for next turn to follow Rule #6 to get into THE RING OF POWER 32.

b) If during play within THE RING OF POWER 32, a player lands on section $10^9$ also designated as one billion (1,000,000,000, or $1,000^3$), a player may move ahead only to the last section of the path $10^{11}$, and wait for next turn to follow Rule #7 and win the game by being the first player to enter THE INNER CIRCLE 34 of game board 10.

RULE #5. If a player rolls THREE-OF-A-KIND with a roll of the three dice a player may JUMP AHEAD using one of the following three choices:

1. A player may JUMP ahead in a clockwise direction to the next "Perfect Cube" number-value. Example: If a player is in the first path 18 on numeral 28 of game board 10 shown in FIG. 6 when turn begins, and the player rolls Three-of-a-Kind, the player may immediately jump to the Perfect Cube numeral section 64 on the same path 18.

2. After entering the fifth circular path 26 of Prime Numbers, a player may JUMP AHEAD in a clockwise direction to the starting position of the next path.

3. A player may elect to simply use the sum-total value rolled on the three dice and count that number of sections ahead to a new position. If this choice is made, a player may move beyond the 0 starting position of the next circular path.

The following special situations are those during which, if when a player's turn begins the player rolls "Three-of-a-Kind with the three dice, the JUMP-MOVE choices of Rule #5 are somewhat modified: (Please use FIG. 6 for observation).

a) If a player is located on the last section 1,000,000 of the sixth path 28 of Perfect Squares and rolls Three-of-a-Kind, a player may JUMP-MOVE ahead only to the last section 90 of the next path 30 and wait for next turn to follow Rule #6 to gain entry into THE RING OF POWER 32.

b) If during play within the seventh path 30, a player rolls Three-of-a-Kind, a player may JUMP-MOVE ahead only to the last section 90 of the path and wait for his/her next turn to follow Rule #6 to gain entry into THE RING OF POWER 32.

c) If during play within the eighth path 32, THE RING OF POWER 32, a player rolls "Three-of-a-Kind, the player may JUMP AHEAD only to the last section $10^{11}$ of THE RING OF POWER and wait for the next turn to follow Rule #7 to try to win the game.

RULE #6. To Enter THE RING OF POWER 32 and position a marker playing piece on the starting position $10^0$ of the eighth circular path 32, a player must first be positioned on the last section 90 of the seventh circular path 30 and must then achieve one of the following situations:

a) Roll a "10" as a total on the three dice;
b) Roll "Three-of-a-Kind";
c) or, Roll a sum total of "100" on turns taken rolling the dice. (Paper and pencil may be necessary)

Once a player has gained entry into THE RING OF POWER 32 and has positioned marker playing piece at the starting position of $10^0$, the player must wait for the next turn to begin working around this eighth circular path 32 of exponential powers of the number ten. To move around THE RING OF POWER, a player must roll an exact "POWER NUMBER" matching an exponent identified on the base numeral "10" in any respective section of the path 32 Example: If a player rolls a total value of "7" on the three dice, he/she may move his/her marker playing piece to the section containing $10^7$. (Rules #3, #4, and #5 above, including restrictions, apply while a player is working around THE RING OF POWER).

If numbers are rolled for which no exponent Power-Number exists in THE RING OF POWER 32, a player must wait for next turn and try again. There may be a considerable amount of movement, forwards as well as backwards, within THE RING OF POWER 32, because players must follow each roll of the dice to the section containing the Power-Number rolled regardless of the advance or retreat involved. Once a player reaches last section $10^{11}$ however, he/she may apply Rule #7.

RULE #7. In order to WIN the game by being the first player to enter "THE INNER CIRCLE" 34 of the game board 10 of FIG. 6, comprised of indicia $10^{12}$ (one trillion or 1,000,000,000,000) a player must first be positioned on section $10^{11}$ within THE RING OF POWER 32, and then roll one of the following four situations with all three geometric flats or dice of FIGS. 3 or 4, respectively:

1. "THREE-OF-A-KIND";
2. ROLL A sum-total of a "10" and then a "12", or a sum total of a "12" and then a "10", ON TWO CONSECUTIVE TURNS AT ROLLING THE DICE;
3. ROLL ANY "TWO-OF-A-KIND" among the three dice rolled ON EACH OF THREE CONSECUTIVE TURNS AT ROLLING THE DICE;
4. BE THE FIRST PLAYER TO ROLL A SUM TOTAL OF "100" ON CONSECUTIVE TURNS TAKEN ROLLING THE DICE. (Paper and pencil may be necessary).

SET II OF THE RULES

RULE #1. Utilizes the rules of SET I of The Rules of The Game EXCEPT that a player must follow Rule #6 herein as it applies to THE RING OF POWER 32 instead of Rule #6 of SET I.

RULE #2. "Sometimes it is very advantageous to look, or even move, backwards in order to get ahead!"

After each player's first turn, and with each new turn taken during play within the first four circular path's 18, 20, 22 and 24 of game board 10 of FIG. 6, a player may use the number value rolled on the dice to investigate not only the section to which the count would move the marker playing piece "AHEAD" of its present location, but a player may also investigate the section to which the value rolled with the dice would count "BEHIND" the present location.

Note: When retracing steps in counting sections "Behind" the starting location, a player must include the "0" section in the count when applicable, and likewise, while counting sections "Ahead" from the starting location.

If the "Ahead", or, if the "Behind", section is a Perfect Square or a Perfect Cube number value, a player may move accordingly. However, in addition to this option involving the "Ahead" and "Behind" sections, a player may investigate and use the value of any one of the Prime Factors of either the "Ahead" sections's number value, or the "Behind" section's number value, as well as the "Starting" section's number value when his/her turn began. Whichever Prime Factor is chosen, a player may then move the marker playing piece ahead clockwise from the present "Starting" location when his/her turn began. (Definition: A prime number is a number into which nothing divides exactly, other than the number itself and the second distinct factor "1").

A player may use this "Prime Factor" Rule #2 to move into the next circular path without waiting at the "0" starting position of the path; however, a player must forego application of this "Prime Factor" Rule #2 after entry has been made into the fifth circular path 26 of "Perfect Squares".

RULE #3. "A good worker is always "Searching" for easier, faster or smarter ways to get the job done! Sometimes he or she invents something to help out the situation and in the process helps others too."

In the application of this rule, players are awarded "BONUS MOVES" for using the SEARCH NUMBERS 6, 7, 8, 9 AND 10 as divisors. After rolling the dice, players now may consider whether the AHEAD, BEHIND, or STARTING sections' respective number values are divisible by any of the "Search Numbers" 6, 7, 8, 9 or 10. If one, two, or all of the respective AHEAD, BEHIND or STARTING sections' number values are exactly divisible by one or more of the "SEARCH NUMBERS", a player may divide any applicable "SEARCH NUMBER" into the chosen section's number value and use the Quotient as a "BONUS MOVE" clockwise forward, after applying Rule #2 above; OR, the Player may use the applicable Search Number Quotient to move ahead in lieu of applying the "Prime Factor" maneuver of Rule #2 above.

A player may use this "Search Number" Rule #3 to move on into the next circular path without waiting at the "0" starting position of the path; however, a player must forego application of this "Search Number" Rule #3 after entry has been made into the fifth circular path 26 of "Perfect Squares".

RULE #4. After rolling the three dice a player may move ahead clockwise from location when the turn began a number of sections representing the total number of divisor factors of the AHEAD, the BEHIND or the STARTING section's number value when this turn began.

A player may use this "Divisor Factors" Rule #4 to move on into the next circular path without waiting at the "0" starting position of said path; however, a player must forego application of this "Divisor Factors" Rule #4 after entry has been made into the fifth circular path 26 of "Perfect Squares". (Hint: The numeral "12" has 6 divisor factors: 1, 2, 3, 4, 6 and 12. The numeral "25" has 3 divisor factors: 1, 5 and 25; "72" has 12 divisor factors: 1, 2, 3, 4, 6, 8, 9, 12, 18, 24, 36 and 72; "37" has only 2 divisor factors: 1 and 37.)

Flexibility and adaptability, adeptness and mental prowess decision-making and problem-solving confidence are touches of the power of thought, along with a faith in patience, a calming alertness and the readiness to handle a situation, as well as help others face those many, many multiple choices! Now an additional multiple choice will be offered to add to your tools of investigative prowess and faith that all problems are solvable:

RULE #5. Except for play within THE RING OF POWER 32, and adhering to exceptions and allowances within previously stated rules of the game, the following is offered: Depending upon whether the roll of the three dice totals a value equal to a Perfect Square such as 4, 9 or 16 or a Perfect Cube such as the value 8, the following is permitted: AFTER rolling the dice and making the appropriate move according to any rules of the game, a player may move ahead a BONUS number of sections equal to the SQUARE ROOT or CUBE ROOT of the respective perfect square or cube (4, 9, 16 or 8) rolled with the three dice. If, however, a player recognizes an advantage to using the actual square or cube root value as a primary move in lieu of treating it as a bonus move in the manner described above, the player may so move. Note: A Square Root is a number which when multiplied by itself equals a specific number! The Square Root of 9 is 3. Also, a Cube Root is a number which when written down three times and multiplied equals a specific number! The Cube Root of 8 is 2. The Cube Root of 27 is 3.

A player may use this "Square Root/Cube Root" Rule #5 to move into any next circular path without waiting at the 0 starting position of said path or any other path, EXCEPT to enter or move around THE RING OF POWER 32.

Notice: With any turn taken, a player may option and prefer to simply use the value rolled on the dice as a clockwise move forward in lieu of any or all of the specialized maneuvers involving the "Prime Factor" Rule #2, "Search Number" Rule #3, the "Divisor Factors" Rule #4", and the "Square Root/Cube Root" Rule #5.

RULE #6. After rolling a "10", Three-of-a-Kind, or a sum total of 100 to be permitted to enter THE RING OF POWER 32 and position a marker playing piece on the starting position $10^0$ as in Rule #6 of Set I, a player must work hard, be very patient and also be lucky. (It is not easy to gain power by being patient, working hard and following the Rules of Fair Play; and when you do, you truly deserve your position!)

In order to work around THE RING OF POWER 32 of game board 10 as shown in FIGS. 2 and 6 a player must advance, with each respective turn taken at rolling the dice, to the "PRIME POWER POSITIONS of 2, 3, 5, 7 and 11". In other words, in consecutive turns taken, a player must first advance to position $10^2$, and then to the position $10^3$ and on next turn to the position $10^5$ and then to the position $10^7$ and finally to the last section $10^{11}$.

In order to move from starting position of $10^0$, a player must roll a number value of "2" to advance to $10^2$, and as play continues with normal rotation of turns, a player must roll a number value of "3" in order to advance to the section $10^3$ and so on and in continuation, a player must roll respective remaining prime power numbers 5, 7 and 11 to advance around THE RING OF POWER 32. In order to achieve the stated required number values, a player may elect to use one, two or all three dice. A player may accomplish this goal of obtaining a particular number value in the following two ways:

1. Roll the actual required number as the number value on one, two or all three dice; OR 2. Roll two or three dice and add the digits of the sum total of the dice rolled to obtain a one digit result required for the move.

Example: To move from starting position $10^0$ and locate on first required position of $10^2$, a player may use only one dice and roll a "2"; a player may elect to roll only two dice and obtain a total of "2"; OR, a player may use two or all three dice and hope to roll a sum total value of "11" because by adding up the digits of the number "11" ($1+1=2$), it offers another choice for the player to achieve the goal of getting a "2" for this move. Likewise, when the player has advanced to needing a "5" to get onto the section $10^5$, a player may choose to use one, two or all three dice, and wait for the total value of "5" to occur; OR, a player may use all three dice and watch for a sum total value of "14" because by adding up the digits of the value "14" ($1+4=5$), it becomes another way to achieve the necessary "5". Likewise, a player could obtain a "7" by either rolling an actual total of "7", or by rolling for a "16" because $1+6=7$. Finally, the only way to obtain an eleven is to roll an actual "11" with two or three dice.

"THREE-OF-A-KIND is the only JUMP-MOVE permitted during the application of this "Prime Power" Rule #6 involving THE RING OF POWER 32 of game board 10 in FIGS. 2 and 6 and the JUMP-MOVE shall be applied in the following manner:

If a player rolls "Three-of-a-Kind", he/she may move marker playing piece only to the next required "Prime Power" location and wait for next turn.

This is the most challenging path to conquer, although it is the easiest to learn. If you want power, confidence and control, you must practice working hard, recognize and appreciate good luck when it comes your way, play fair, and not give up. Remember: The other players must work their way around this RING 32 too.

RULE #7. This final rule of SET II of The Rules of the Game is exactly the same as Rule #7 of SET I and is repeated herein:

In order to WIN the game by being the first player to enter "THE INNER CIRCLE" 34 of game board 10 of FIG. 6, comprised of indicia $10^{12}$ (one trillion or 1,000,000,000,000) of game board 10 of FIG. 6, a player must first be positioned on section $10^{11}$ within THE RING OF POWER 32, and then roll one of the following four situations with all three dice or geometric flats shown in FIGS. 3 and 4:

1. "THREE-OF-A-KIND";
2. ROLL A sum total of a "10" and then a "12", or a sum total of a "12" and then a "10", ON TWO CONSECUTIVE TURNS AT ROLLING THE DICE;
3. ROLL ANY "TWO-OF-A-KIND" among the three dice rolled ON EACH OF THREE CONSECUTIVE TURNS AT ROLLING THE DICE;
4. BE THE FIRST PLAYER TO ROLL A SUM TOTAL OF "100" ON CONSECUTIVE TURNS TAKEN ROLLING THE DICE. (Paper and pencil may be necessary).

SET III OF THE RULES

SET III of the Rules of the Game is a set of rules which allows the rules of SET II and includes a few other maneuvers and pressures for players to work with. This is the most challenging set of rules requiring the most patience, understanding and ability, especially when it comes to helping new players experience various advantageous moves, as well as some of the luck it takes to get through any of the three sets of rules of the three different levels of play. This set of rules is for the players who are confident about their multiplication tables and the exhilarating familiarity with exponential squares, cubes and roots, as well as the quick thinking it takes to make good decisions while others are pressuring and waiting to take their turns. This set of rules also tests each player's sense of loyalty to the "Group Participants" and will rely upon focused talent, as well as respect for and responsibility to others.

RULE #1. Rule 1 includes all seven rules of SET II of The Rules of the Game.

RULE #2. In order to prepare for playing SET III of The Rules of the Game, each player must gather together various combinations of three of the marker playing pieces 38, 40 and 42 as shown in FIG. 5. Various combinations of "Groups-of-Three" are possible as follows: A group of three RED marker playing pieces would include the red solid rectangle 38, the red solid triangle 40, and the red solid cylinder 42; all WHITE would include a solid white rectangle, a solid white triangle, and a solid white cylinder piece; and all BLUE pieces would be similarly grouped. A group of all three solid RECTANGLES 38 (marker playing pieces) would include a red solid rectangle piece, a white solid rectangle piece and a blue solid rectangle piece; all three solid TRIANGLES 40 would include the red, the white and the blue solid triangular pieces; and all three solid Cylinders 42 would be similarly grouped. Selections of "Groups of Three" marker playing pieces must be made so as to clearly differentiate, either by color or geometric design, each player's respective "Group-of-Three" marker playing pieces to be used during the play of SET III of the Rules of the Game.

There are enough marker playing pieces included with the game board 10 to enable three players to play SET III of the Rules or the Game, involving a total of nine marker playing pieces in clearly differentiated "Groups of Three". If a fourth or more players intend to play, a group of three differently colored or differently shaped marker playing pieces are used for each of any additional players.

Each player rolls the dice to determine his/her respective turn to be taken during the playing of the game. All three marker playing pieces of each "Group-of-Three" are placed on the space above the ENTER sign of game board 10 shown in FIGS. 1, 2 and 6. The first player places one of his/her "Group-of-Three" marker playing pieces on the 0 starting position, rolls the dice and makes the first move. After each player has a marker playing piece in play, and after rolling the dice on the next turn taken, each respective player must decide whether to again move the marker already located on the first path 18, or bring a second member of the "Group-of-Three" onto the first path. In other words, any one of the markers in a respective "Group-of-Three" may be moved once the player controlling that particular "Group-of-Three" markers decides which of the many "Multiple Choices" will be used for movement, and for which one of the three marker playing pieces of the group the best advantage would be gained.

Finally, each player's underlying thought and goal with each turn is to quickly scan all "Multiple Choices" and keep each and all of the partnership "Group-of-Three" markers moving toward the goal of being the first entire "Group-of-Three" markers to reach THE INNER CIRCLE 34 and the value representing victory: $10^{12}$ (one trillion or 1,000,000,000,000) of game board 10 as represented in FIG. 6.

RULE #3. Whenever a marker playing piece from one of the partnership "Groups-of-Three" reaches the INNER CIRCLE 34, the following advantage is given to one and only one of any remaining marker(s) of same "Group-of-Three": A player may choose one of the remaining marker playing pieces and immediately make a clockwise JUMP-AHEAD move either to the next Perfect Cube or to the second of the next two Perfect Squares, whichever the player controlling the marker playing piece prefers; however, the player must forfeit this extra move for any marker playing piece already located within THE RING OF POWER 32. (Remember: ALL exceptions or adjustments to Jump-moves involving Perfect Squares and Cubes must be acknowledged.)

RULE #4. Whenever a marker playing piece from one of the partnership "Groups-of-Three reaches THE INNER CIRCLE 34 of $10^{12}$ (one trillion or 1,000,000,000,000) and a team marker playing piece has been moved in accordance with Rule #3 described above, then and only then, A Private, Out-of-Turn, BONUS ROLL OF THE DICE will be offered to whichever marker playing piece is standing in last place, farthest away from victory. It matters not which "Group-of-Three" the last place marker playing piece belongs to regardless of whether that marker is an opponent, a partner, a different color, a different design or whatever. After the above Rule #3 of this SET III has been completed, whichever marker playing piece is in a last place location on the game board 10 of FIG. 1, that particular marker playing piece will be offered an immediate, extra turn to roll the dice and make a move according to the roll for that marker only, followed by normal rotation of turns. EXCEPTION: The only restriction to this BONUS roll of the dice is that it may only be offered if the last place marker playing piece has not yet reached the starting position $10^0$ in THE RING OF POWER 32.

RULE #5. The last rule of SET III is as follows: When all three marker playing pieces of a particular partnership "Group-of-Three" have reached the ultimate goal and victory of $10^{12}$ (one trillion or 1,000,000,000,000) within THE INNER (Winner's) CIRCLE 34 of game board 10 as represented in FIG. 6, then that partnership "GROUP-OF-THREE" is the VICTORY GROUP! The game could be considered over at this point; HOWEVER, if two or more players and their respective "Groups-of-Three" choose to remain in competition in order to determine second place, they may of course do so.

Post Script: Another multiple choice option may be as follows

It is also permissible in playing this SET III of The Rules of the Game for the players to agree to play with two, rather than three, marker playing pieces, and thus simply apply the rules to "Groups-of-Two" instead of "Groups-of-Three".

Hereinbefore has been disclosed a mathematical game apparatus suitable for use by young as well as old specifically to entertain as well as increase the knowledge of the players. It will be understood that various changes in the details, materials, arrangement of parts and operating conditions which have been herein described and illustrated in order to explain the nature of the invention may be made by those skilled in the art within the principles and scope of the instant invention.

Having thus set forth the nature of the invention, what is claimed is:

1. A mathematical game board apparatus comprising:
    a) a game board having a series of distinct concentric circular paths, each said path being divided into a plurality of sections with indicia provided therein having a numerical relationship therebetween, the circular paths, from the outermost circular path to the innermost circular path having the numerals;
        i) from "zero" through "one hundred", in multiples of "one",
        ii) from "zero" through "one hundred", in multiples of "two",
        iii) from "zero" through "ninety-nine", in multiples of "three",
        iv) from "zero" through "one hundred twenty-five", in multiples of "five",
        v) from "zero" through "ninety seven" starting with the prime number "two" followed by the consecutive prime numbers existing between "zero" and "one hundred",
        vi) from "zero" through "fifteen" raised to the second power, followed by "twenty" raised to the second power, and then skipping by "tens" to "one hundred" raised to the second power, and ending with "one thousand" raised to the second power and indicia showing the equal thereof of "one hundred" raised to the third power which has the same value,
        vii) from "zero" through "ninety" being multiples of the numbers "four", "six", "seven", "eight", "nine" and "ten", beginning with "four" times "six" and ending with "nine" times "ten",
        viii) from "ten" raised to the "zero" power to "ten" raised to the "eleventh" power in power increments of "one", and
        ix) a single unitary centrally disposed section with indicia indicating the numeral "ten" raised to the twelfth power;
    b) a plurality of marker playing pieces or tokens in the form of various solid geometrical shapes; and
    c) at least three geometric flats, each said geometric flat being non-cubically shaped having a plurality of flat sides thereon.

2. A mathematical game board apparatus comprising:
    a) a game board having a series of distinct concentric circular paths, each said path being divided into a plurality of sections with indicia provided therein having a numerical relationship therebetween;
    b) a further surrounding area divided into 101 different sections, each of said sections including numerical indicia therein being the divisor factors of the numbers appearing in the first concentric path, which are used for information purposes;
    c) a plurality of marker playing pieces or tokens in the form of various solid geometrical shapes; and
    d) at least three geometric flats, each said geometric flat being non-cubically shaped having a different plurality of flat sides thereon with like numbers.

3. A mathematical game board apparatus comprising:
    a) a game board having a series of distinct concentric circular paths, each said path being divided into a plurality of sections with indicia provided therein having a numerical relationship therebetween, as follows:

i) the outermost of said circular paths being divided into one hundred and one (101) arcuate sections bearing the numerals from "zero" through "one hundred" in multiples of "one", ii) the next outermost of said circular paths being divided into fifty one (51) arcuate sections bearing the numerals "zero" through "one hundred", in multiples of "two" with each section of said next outermost path encompassing an arcuate path being equal to two sections of said outermost path, iii) the third outermost of said circular paths being divided into thirty-four (34) arcuate sections bearing the numerals from "zero" through "ninety-nine" in multiples of "three" with each section of said third outermost path encompassing an arcuate path being generally equal to three sections of said outermost path.

4. A mathematical game board apparatus according to claim 3 wherein said concentric circular paths number nine (9), with said ninth path being a centrally disposed unitary circular area.

5. A mathematical game board apparatus according to claim 3 wherein the fourth outer path is divided into 26 sections, the fifth outermost path is divided into 26 sections, the sixth outermost path is divided into 26 sections, the seventh outermost path is divided into 26 sections, the eighth outermost path is divided into 12 sections and the ninth path is one centrally disposed unitary section.

6. A mathematical game board apparatus according to claim 3, wherein certain sections of said circular paths are color coded to indicate a particular numerical relationship.

7. A mathematical game board apparatus according to claim 3, wherein some of said plurality of sections have a symbol included therein, in addition to said indicia to indicate certain numerical relationships between the numerical indicia found therein and the numerical indicia found in another path section.

8. A mathematical game board apparatus according to claim 3 wherein said marker playing pieces are in the form of a solid rectangle, solid triangle or a solid cylinder.

9. A mathematical game board apparatus according to claim 8 wherein each different solid marker playing piece is colored differently.

10. A mathematical game board apparatus according to claim 3 wherein said geometric flats are formed from solid geometric figures having a different plurality of flat surfaces thereon with like numbers.

11. A mathematical game board apparatus according to claim 10 wherein said flat surfaces include indicia thereon.

12. A mathematical game board apparatus according to claim 11 wherein each said flat surface has a plurality of dots on each said geometric flat thereon with each said flat surface being different from those appearing on every other flat surface.

13. A mathematical game board apparatus according to claim 3 wherein the geometric flats include a sphere having provided thereon five flat surfaces, a truncated pyramid having six flat surfaces and a pyramid having seven flat surfaces thereon.

14. A mathematical game board apparatus according to claim 3 wherein said geometric flats are made of a resilient material.

15. The method of playing a game board apparatus according to claim 3 wherein the numbers obtained by tossing the geometric flats allows the player multiple choices within which to move his/her playing pieces.

* * * * *